United States Patent
Dalsgaard et al.

(10) Patent No.: US 7,724,697 B2
(45) Date of Patent: May 25, 2010

(54) METHOD, APPARATUS AND SYSTEM FOR PROVIDING REPORTS ON CHANNEL QUALITY OF A COMMUNICATION SYSTEM

(75) Inventors: Lars Dalsgaard, Oulu (FI); Troels Kolding, Klarup (DK)

(73) Assignee: Nokia Corporation, Espoo (FI)

( * ) Notice: Subject to any disclaimer, the term of this patent is extended or adjusted under 35 U.S.C. 154(b) by 267 days.

(21) Appl. No.: 11/970,390

(22) Filed: Jan. 7, 2008

(65) Prior Publication Data

US 2008/0165698 A1 Jul. 10, 2008

Related U.S. Application Data

(60) Provisional application No. 60/879,414, filed on Jan. 8, 2007.

(51) Int. Cl.
G08C 17/00 (2006.01)
(52) U.S. Cl. .................................... 370/311; 455/343.2
(58) Field of Classification Search ................. 370/235, 370/252, 311, 332; 455/574, 127.5, 343.2, 455/343.5
See application file for complete search history.

(56) References Cited

U.S. PATENT DOCUMENTS

2005/0201296 A1* 9/2005 Vannithamby et al. ...... 370/241
2007/0054689 A1* 3/2007 Baker et al. ................. 455/522

FOREIGN PATENT DOCUMENTS

WO  WO 2004/098072 A2  11/2004
WO  WO 2004/102828 A1  11/2004

OTHER PUBLICATIONS

3rd Generation Partnership Project (3GPP), Technical Specification Group Radio Access Network, "Overhead Analysis and Resource Assignment for Uplink CQI Feedback Channel and TP," Paper No. XP-002475856, Mar. 31, 2006, 18 pages, Athens, Greece.
3rd Generation Partnership Project (3GPP), Technical Specification Group Radio Access Network, "Control of CQI Feedback Signalling in E-UTRA," Paper No. XP-002475857, Nov. 10, 2006, 8 pages, Riga, Latvia.

(Continued)

Primary Examiner—Brenda Pham
(74) Attorney, Agent, or Firm—Slater & Matsil, L.L.P.

(57) ABSTRACT

In accordance with aspects of the present invention, a method, an apparatus, a system, and software are provided to link channel quality indication reporting with periods when communication terminals, such as user equipment, are active. In one aspect, an apparatus (e.g., a communication terminal) includes a determination module configured to determine when at least one component of the apparatus is in an inactivated state. The apparatus also includes an interrupter configured to interrupt a transmission of at least one channel quality indication report when the at least one component is in the inactivated state. In another aspect, a method includes determining when at least one component of a communication terminal is in an inactivated state and interrupting transmitting at least one channel quality indication report when the at least one component is in the inactivated state.

28 Claims, 4 Drawing Sheets

OTHER PUBLICATIONS

3rd Generation Partnership Project (3GPP), Technical Specification Group Radio Access Network, "Requirements for Evolved UTRA (E-UTRA) and Evolved UTRAN (E-Utran)(Release 7)," Paper No. 3GPP TR 25.913 V.7.3.0, Mar. 2006, 3 pages.

Notification of Transmittal of the International Search Report and the Written Opinion of the International Search Authority, or the Declaration issued for International Application No. PCT/IB2008/050035 filed on Jul. 1, 2008 ,13 pages.

* cited by examiner

US 7,724,697 B2

METHOD, APPARATUS AND SYSTEM FOR PROVIDING REPORTS ON CHANNEL QUALITY OF A COMMUNICATION SYSTEM

This application claims the benefit of U.S. Provisional Application No. 60/879,414, entitled "Method, Apparatus and System for Channel Quality Reporting," filed on Jan. 8, 2007, which is incorporated herein by reference.

TECHNICAL FIELD

The present invention is directed, in general, to communication systems and, more particularly, to a method, an apparatus and a system for providing reports on channel quality of a communication system while allowing for conservation of system resources.

BACKGROUND

Universal Mobile Telecommunications System (UMTS) is a wireless system that is known in the art and is designed to provide higher data rates and enhanced service to subscribers. The Third Generation Partnership Project (3GPP), including the specifications relating to the Evolved Universal Terrestrial Radio Access (UTRA) and Universal Terrestrial Radio Access Network (UTRAN), standardizes UMTS. The UMTS network includes user equipment (UE, also referred to as a "user equipment device" or a "user equipment terminal"), UMTS Terrestrial Radio Access Network (UTRAN), and core network (CN). The UE is interfaced to the UTRAN over a radio Uu interface, while the UTRAN interfaces to the core network over a wired Iu interface. The CN is coupled to an external network, which may include the Internet, a Public Land Mobile Network (PLMN), a Public Switched Telephone Network (PSTN), an Integrated Services Digital Network (ISDN), etc., which can exchange information to and from a UE. A communication terminal (e.g., user equipment) may be a wireless communication terminal such as one employed in a network, not just by an "end user."

The UTRAN includes multiple Radio Network Subsystems (RNSs), each of which contains at least one Radio Network Controller (RNC). However, it should be noted that the RNC may not be present in the Long Term Evolution (LTE) of UTRAN (E-UTRAN). LTE may include a centralized or decentralized entity for control information. In operation, each RNC may be connected to multiple Node Bs, which are the UMTS counterparts to Global System for Mobile Communications (GSM) base stations. Each Node B may be in radio contact with multiple UEs via the radio Uu interface.

The Third Generation Partnership Project Long Term Evolution (3GPP LTE) project is the name generally used to refer to an ongoing effort across the industry to improve the UMTS for mobile communication to cope with continuing new requirements and the growing base of users. The goals of this broadly based project include improving communication efficiency, lowering costs, improving services, making use of new spectrum opportunities, and achieving better integration with other open standards. The 3GPP LTE project is not by itself a standard-generating effort, but will result in new recommendations for standards for the UMTS.

The wireless communication systems as described herein are applicable to, for instance, 3GPP LTE compatible wireless communication systems and, of interest, are an aspect of LTE referred to as "evolved UMTS Terrestrial Radio Access Network," or E-UTRAN. In general, E-UTRAN resources are assigned more or less temporarily by the network to one or more UEs by the use of allocation tables, or more generally by the use of a downlink resource assignment channel or physical downlink shared control channel (PDSCCH). The 3GPP LTE compatible wireless communication systems are packet-based systems and, therefore, there may not be a dedicated connection reserved for communication between a UE and the network. Users are generally scheduled on a shared channel every transmission time interval (TTI) by a Node B or an evolved Node B (e-Node B). A Node B or an e-Node B controls the communications between user equipment terminals in a cell served by the Node B or e-Node B. In general, one Node B or e-Node B serves each cell. Resources needed for data transfer are assigned either as one time assignments or in a persistent/semi-static way. The 3GPP LTE compatible wireless communication systems, also referred to as 3.9G, generally support a large number of users per cell with quasi-instantaneous access to radio resources in the active state. It is typically a design requirement that at least 200 users per cell should be supported in the active state for spectrum allocations up to 5 megahertz (MHz), and at least 400 users for a higher spectrum allocation.

In order to facilitate scheduling on the shared channel, the e-Node B transmits an allocation in a downlink-shared channel to the UE. The allocation information may be related to both uplink and downlink channels. The allocation information may include information about which resource blocks in the frequency domain are allocated to the scheduled user(s), the modulation and coding schemes, the size of the transport block, and the like.

A Node B or an e-Node B requires information related to instantaneous channel quality so that it can perform scheduling and allocation. In order for a Node B or e-Node B to be informed of the channel quality, the UE provides channel quality indication (CQI) reports (which may also be generally referred to herein as "channel quality reports") to the Node B or the e-Node B. The UE periodically or in response to a particular event may "send" (i.e., may "transmit" or may "report") CQI reports to the respective serving Node B or e-Node B. The CQI reports indicate the recommended transmission format for the next transmission time interval. For an active UE (i.e., a UE that is involved in communication that is configured to use periodic reporting), the UE sends a CQI report every given number of sub-frames. In event-based CQI reporting (i.e., triggered CQI reporting), UEs only send a CQI report when a certain system event has occurred, for instance, when it is assigned a downlink resource or when transmitting an acknowledgement/negative acknowledgement (ACK/NACK) in an uplink. The CQI report may be constructed in such a way that it indicates the expected supported transport block size under certain assumptions, which may include the recommended number of physical resource blocks (PRBs), the supported modulation and coding scheme, the recommended multiple input-multiple output (MIMO) configuration, as well as a possible power offset.

The CQI reports are used for resource scheduling and adaptive modulation and coding. The Node B or e-Node B typically assigns user equipment resources based on their respective channel qualities as indicated by the CQI reports. User equipment is also assigned a code rate and modulation format based on channel quality. The Node B typically attempts to adapt to the current channel conditions of a UE by selecting the highest possible modulation and coding scheme that will keep the frame error probability below a certain threshold, for example 10% in High Speed Downlink Packet Access (HSDPA).

Transmission of a CQI report, like any other transmission from a UE, is an energy-consuming event that detracts from "battery life." Battery life relates to the battery-recharging interval for the UE, which is a critical market acceptance parameter for an end user.

Considering the requirement for a UE to transmit a CQI report as described above, what is needed in the art for a communication system including UEs powered by an internal battery is a system and method capable of providing CQI reports to a Node B or an e-Node B for downlink packet scheduling and link adaptation to adaptive modulation and coding (AMC) that accommodate conservation of power in the UE, while also providing efficient support of discontinuous reception (DRX) and transmission (DTX) processes operative therein.

SUMMARY OF THE INVENTION

These and other problems are generally solved or circumvented, and technical advantages are generally achieved, by advantageous embodiments of the present invention, which include a method, an apparatus and a system for providing reports on channel quality of a communication system while allowing for conservation of system resources. In one aspect, an apparatus (e.g., a communication terminal) includes a determination module configured to determine when at least one component of the apparatus is in an inactivated state. The apparatus also includes an interrupter configured to interrupt a transmission of at least one channel quality indication report when the at least one component is in the inactivated state. In another aspect, a method includes determining when at least one component of a communication terminal is in an inactivated state and interrupting transmitting at least one channel quality indication report when the at least one component is in the inactivated state.

In another aspect, an apparatus (e.g., a communication terminal) includes means for determining when at least one component of the apparatus is in an inactivated state. The apparatus also includes means for interrupting a transmission of at least one channel quality indication report when the at least one component is in the inactivated state.

In yet another aspect, a communication system includes user equipment and a network entity. The user equipment is configured to employ discontinuous reception to provide periods of time reserved for active reception and periods of time for inactive reception. The user equipment is configured to transmit a channel quality indication report during periods of time of active reception. The network entity is configured to communicate with the user equipment and receive the channel quality indication report therefrom. The network entity is also configured to reserve a resource to receive the channel quality indication report from the user equipment during periods of time of active reception.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the invention, and the advantages thereof, reference is now made to the following descriptions taken in conjunction with the accompanying drawing, in which.

DETAILED DESCRIPTION OF ILLUSTRATIVE EMBODIMENTS

Figure 1:
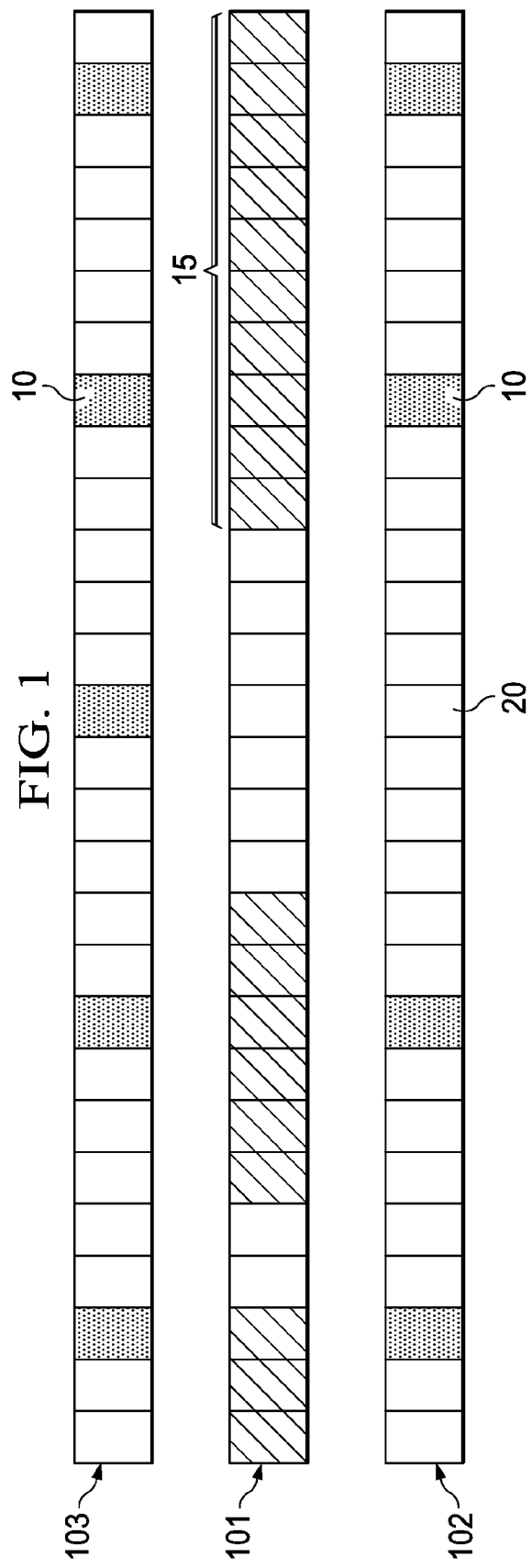
FIG. 1 illustrates a coupled channel quality indication reporting pattern and a discontinuous reception pattern constructed according to an advantageous embodiment of the invention.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to exemplary embodiments in a specific context of scheduling CQI reports to manage uplink signaling overhead, communication resources, and battery energy drain. In general, embodiments of the invention may be applied to any form of communication network such as a cellular wireless communication network.

Scheduling CQI reports involves balancing uplink signaling overhead and the efficiency of downlink scheduling and adaptive modulation and coding. In general, the more CQI reports that are transmitted by a UE, the greater the downlink efficiency, but at the cost of higher uplink signaling load and battery drain. In general, a CQI report is useful when an information packet is about to be transmitted on the downlink, or when the Node B or e-Node B is performing multi-user scheduling.

In battery-operated devices such as mobile UE and other mobile devices, it is important to limit power consumption to extend battery life. Battery life can be extended by reducing power consumption during periods of inactivity in which certain functions can be turned-off or operated in some form of a reduced-power mode. The UMTS is configured such that a UE can operate with reduced functions during periods of inactivity. The UE need only occasionally perform certain functions to maintain synchronization and communication with its associated Node B or e-Node B while a call or other dedicated connection is not in progress, which provides periods of inactivity that can allow the UE to minimize its energy consumption. This is achieved by the UE operating using discontinuous reception (DRX) or discontinuous transmission (DTX), wherein the UE periodically cycles between "sleep" and "wake" periods. DRX and DTX as used herein can refer to a period of time during which reception and transmission, respectively, by a UE or other communication terminal are disabled. During sleep periods, unneeded power-consuming processes and hardware are turned off. During wake periods, these processes and hardware to maintain synchronization and communication with the associated base station are momentarily turned back on.

By default, periodic CQI reports are delivered by each UE to the network on a regular basis during active sessions for the purpose of allowing the network to optimize scheduling of radio resources to the various UEs. In order to achieve multi-user diversity gain, it may be necessary to send CQI reports that may not result in immediate scheduling of a resource, and may be used to discard a particular user (i.e., a UE for scheduling). However, if it is known that a particular UE will not be scheduled or is incapable of being scheduled, such as if the UE is in a period of DRX, then any CQI reports transmitted by that UE use system resources without any or only very limited benefit to the system. While CQI reports are beneficial when the UE is engaged in active data transmission, it is only marginally beneficial for the UE or the network to have the UE send CQI reports to the network when it is not possible to schedule the UE.

An embodiment of the invention involves or is related to cooperation between elements of a communication system. Examples of a wireless communication system include implementations of GSM and UMTS. Each such wireless communication system includes a radio access network (RAN). In UMTS, the RAN is referred to as UTRAN. A UTRAN includes one or more Radio Network Controllers (RNCs), each having control of one or more Node Bs, which are network systems configured to communicatively couple to one or more UEs. The combination of an RNC and the Node Bs is called a Radio Network System (RNS). It is understood that the RNC may not be present in the LTE of UTRAN (also referred to as E-UTRAN), since LTE may include a centralized or decentralized entity for control of information. A GSM RAN includes one or more base station controllers (BSCs), each controlling one or more base transceiver stations (BTSs). The combination of a BSC and the BTSs is called a base station system (BSS). While embodiments of the invention are discussed in relation to LTE and E-UTRAN, it is understood that embodiments may be implemented in any communication system.

Referring initially to FIG. 1, illustrated is a coupled channel quality indication reporting pattern and a discontinuous reception pattern constructed according to an advantageous embodiment of the invention. In the illustrated embodiment, a predefined channel quality indication (CQI) reporting pattern 103 has been established by radio resource control (RRC) signaling. The CQI reporting pattern may have also been configured by other one-shot signaling methods. Each box represents a minimum scheduling/activity interval, for example, one transmission time interval (TTI), which is typically, without limitation, about 1 millisecond (ms). The scheduling/activity interval may vary depending upon the communication system in which the present invention is implemented. The periodic CQI reports are generally delivered to the network by each UE within a cell served by a Node B or an e-Node B. The UE is informed and aware when and what type of CQI report to prepare and transmit.

In FIG. 1, box 10 represents a CQI report prepared and transmitted (i.e., CQI on) by the UE in accordance with the predefined CQI reporting pattern shown in FIG. 1. CQI reports generally allow the network to optimize the scheduling of radio resources for the various served UEs.

FIG. 1 also shows an exemplary discontinuous reception (DRX) pattern 101 that may be employed by a particular UE within the network. Discontinuous reception generally involves powering down or inactivating a component or components of the user equipment (i.e., placing the UE in sleep mode), in order to conserve a power source of the UE, such as a battery. Discontinuous reception may occur based on a predefined service pattern (i.e., each UE enters a sleep mode or powered-down state at regular intervals), or may be event-based, such as placing the UE in a sleep mode when it is not considered for scheduling. An aggressive event-based discontinuous reception concept may employ discontinuous reception when certain conditions occur, such as a buffer status report from the UE, or the UE has been physically inactive for a period of time. In FIG. 1, the shaded boxes 15 of the DRX pattern represent when the UE is on and not in a sleep mode, and is available for data transmission or scheduling (i.e., it is functioning normally and reading allocation information). Empty boxes of the DRX pattern indicate that the UE is in a sleep mode (i.e., the UE or one or more components therein, are powered down to conserve power).

In accordance with an exemplary embodiment, FIG. 1 shows the resulting CQI pattern 102 when the CQI reporting pattern is linked to actual transmission periods of the UE, or periods when the UE receives data or control in the downlink (DL), for example, when the UE is being scheduled through PDSCCH in the DL for either the uplink (UL) or DL. If discontinuous reception patterns are periodic (i.e., if reception patterns are predefined from knowledge of a service pattern), the CQI reporting pattern may be set so that CQI reports are aligned optimally according to the discontinuous reception pattern. For example, if CQI reports are transmitted every sixth TTI, then the discontinuous reception pattern may be set so that the UE is in sleep mode only during the fourth and fifth TTIs. As shown in FIG. 1, an aggressive discontinuous reception pattern 101 is employed (i.e., the UE is in sleep mode based on particular events). In the resulting CQI reporting pattern 102, CQI reports are not reported when the UE is in sleep mode or otherwise not scheduled to engage in transmission. When the UE is in sleep mode due to discontinuous reception, the UE does not perform and send CQI measurements to the network. For example, box 20 represents an interrupted CQI report that was either not prepared and/or transmitted by the UE because the UE was in sleep mode. Had the UE or a component of the UE not been in sleep mode, a CQI report would have been transmitted in accordance with the CQI reporting pattern.

As seen in FIG. 1, when the UE is on and involved in active data transfer, CQI measurements and reporting continue to be performed. Therefore, the predefined CQI reporting pattern is only performed when the UE is scheduled to engage in active data transmission or is actively transferring data, for example, when the UE is not employing discontinuous reception. It is also understood that the Node B or e-Node B may also be aware that the UE will not prepare and/or transmit CQI reports when the UE is in sleep mode and, therefore, the e-Node B does not have to reserve resources for the CQI report in the uplink. For example, this may allow capacity to be available so that additional control signaling can be provided or the connections of other users improved.

The system and method discussed above provide several advantages. Both the e-Node B and the UE are in control of the event, which makes resource optimization easier. There is no requirement for the UE to perform unnecessary CQI measurements and reporting. The UE may accordingly experience increased power savings. Air interface resources are conserved because unnecessary CQI reports are not transmitted. Furthermore, CQI measurements and reports on the UE side are linked to periods when the UE is in active data transmission, thereby eliminating unnecessary CQI measurements and report and conserving UE resources (i.e., battery energy).

Figure 2:
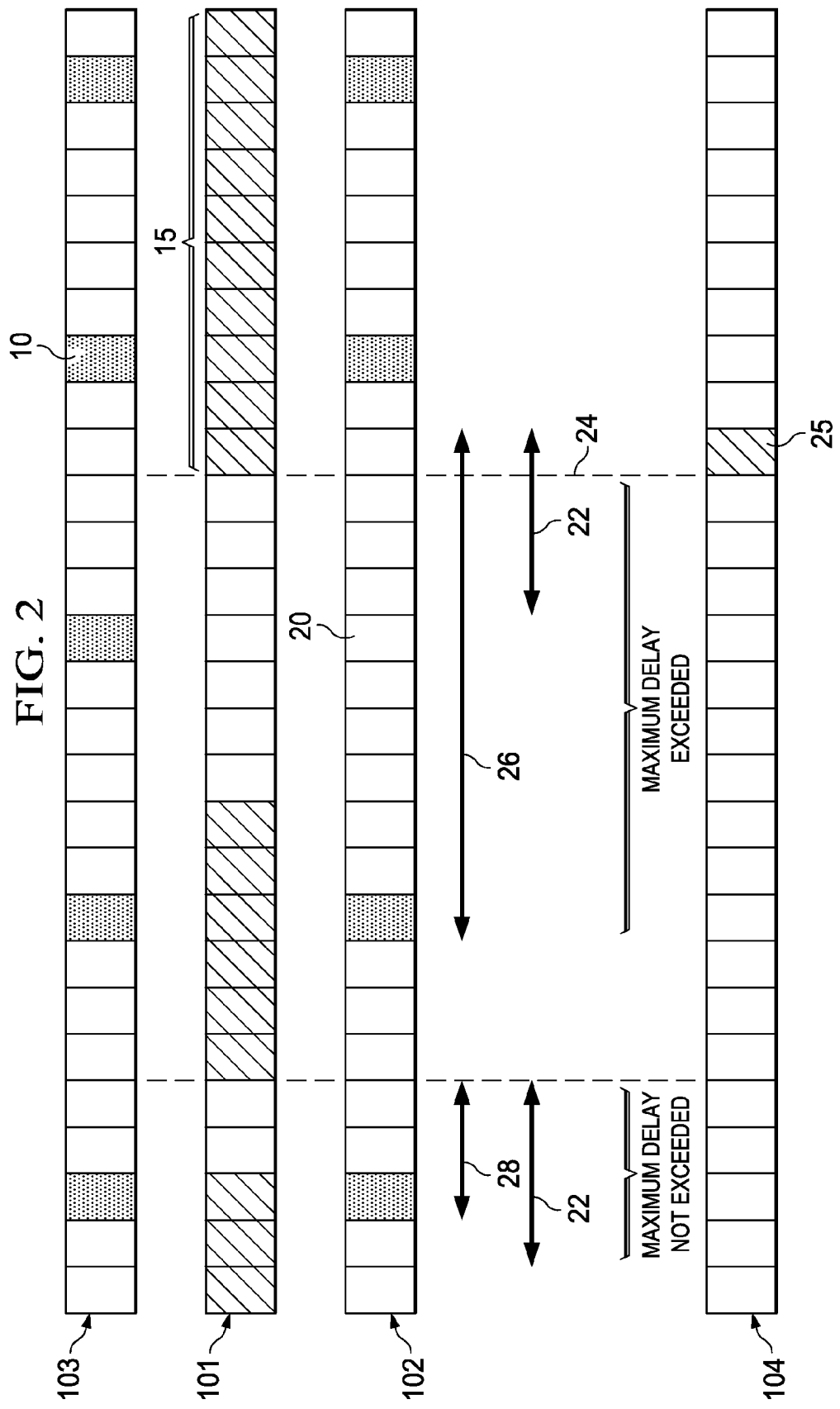
FIG. 2 illustrates a coupled channel quality indication reporting pattern and a discontinuous reception pattern in which an extra channel quality indication report may be provided if a delay is exceeded, constructed according to an advantageous embodiment of the invention.

Turning now to FIG. 2, illustrated is a coupled channel quality indication reporting pattern and a discontinuous reception pattern in which an extra channel quality indication report may be provided if a delay is exceed constructed according to an advantageous embodiment of the invention. The event-based CQI reporting scheme is based on a UE coming out of discontinuous reception (DRX), and the amount of time that has passed since the last CQI report was transmitted by the UE to the network. As seen in FIG. 2, the event-based CQI reporting scheme may be in addition to a periodic CQI reporting pattern. A delay time (e.g., a maximum delay 22) is defined which corresponds with the amount of time that a CQI report is believed to be valid. The maximum delay time 22 may be set by the network, or may be dependent upon the particular capabilities of a specific UE. The maximum delay time 22 is used by the UE and the network to determine whether a CQI report should be sent in the uplink (UL) after the UE has "woken up" from discontinuous reception (i.e., from a sleep mode). For example, the amount of time between the previously transmitted CQI report and the time frame in which the UE becomes active is determined. In FIG. 2, the first amount of time 28 is less than the maximum delay time 22 and, therefore, the maximum delay time is not violated. In this and following FIGUREs, an element with a reference designation described with reference to a previous FIGURE will not be redescribed in the interest of brevity.

In FIG. 2, the second amount of time 26 is greater than the maximum delay time 22 and, therefore, a "helper CQI" 25 is transmitted by the UE in accordance with an additional CQI pattern (extra scheduled CQI) 104 at this time. The maximum delay time 22 may be established when the discontinuous reception pattern is initially established, and the maximum delay time 22 informs the UE whether the last transmitted CQI is useful or not. Alternatively, the UE could be indicated in the PDSCCH, when the UE is being scheduled, whether either a "helper CQI" (an extra CQI that may be in an alternate format from that of a normal CQI) is to be sent, or whether a previous CQI is still valid. The maximum delay time 22 may be a cell parameter or a user-specific parameter depending upon an allowed level of signaling and complexity.

Still referring to FIG. 2, when the UE comes out of discontinuous reception (DRX) and moves into the "awake," activated state at specified boundaries 24, either due to periodic/regular DRX or dynamic DRX, the UE may check with its defined CQI reporting pattern (e.g., periodic), to determine whether it is required to report a CQI report at this time. If it is possible for the UE to transmit a CQI report at this time, then a CQI report may be transmitted in accordance with the UE's defined CQI reporting pattern. For example, if in FIG. 2 the predefined CQI reporting pattern corresponds with the DRX-specified boundary 24, then the UE may transmit a CQI report at this time. If no CQI report is to be transmitted at this time, the UE or other network element may then compare the amount of time elapsed since the UE reported its last CQI report to the network with the maximum delay time 22. If the amount of time is greater than the maximum delay time 22, for example, the amount of time 26 in FIG. 2, the UE may prepare and transmit a "helper CQI" 25 report to the network in order to facilitate initialization of communication with the UE. If the amount of time is not greater than the maximum delay time 22, for example, the amount of time 28 in FIG. 2, the UE may then transmit a CQI report at its next defined time.

The UE may also continue to compare the maximum delay time 22 for each successive subframe and transmit a "helper CQI" 25 the first time that the maximum delay time 22 is exceeded. The "helper CQI" 25 may be counted when the next TTI delay calculation is conducted, for example, in determining the amount of time elapsed since transmission of the previous CQI report, the "helper CQI" 25 may be considered to be the previous CQI report even though it is not transmitted in a predefined TTI. Alternatively, it could be controlled by the network and indicated to the UE when addressing the UE in PDSCCH. In this way, the network would be the controlling part of the decision when a "helper CQI" would be needed.

A "helper CQI" report may be reduced in size, for example, to only a simple wideband CQI report. The format of a "helper CQI" may be defined during initial configuration or broadcast, and actual implementation of a "helper CQI" depends on how aggressive the system and/or network is configured during a first transmission from UEs. For example, simple "helper CQI" reports facilitate robust distributed transmission, while more complex "helper CQI" reports may facilitate advanced scheduling and link adaptation. Resources may be allocated in the uplink for a "helper CQI" by the Node B or e-Node B, since the network should be able to determine when a "helper CQI" will be transmitted.

Furthermore, in the exemplary embodiment of the invention shown in FIG. 2, it may be possible to ensure that an acknowledgement/negative acknowledgement (e.g., ACK/NACK) is not transmitted at the same time as a "helper CQI." The maximum delay time 22 may be set so that it is longer than a hybrid automatic repeat request (HARQ) transmission to a required acknowledgement/negative acknowledgement time. Therefore, it may be possible to use the resource block normally used for acknowledgement/negative acknowledgement to send a reduced size CQI report (provided that dedicated channel exists). For example, the resolution of a wideband CQI may be reduced to 2-3 bits and thereby allow for operation of more course physical resource block (PRB) resolution and still achieve gain.

Figure 3:
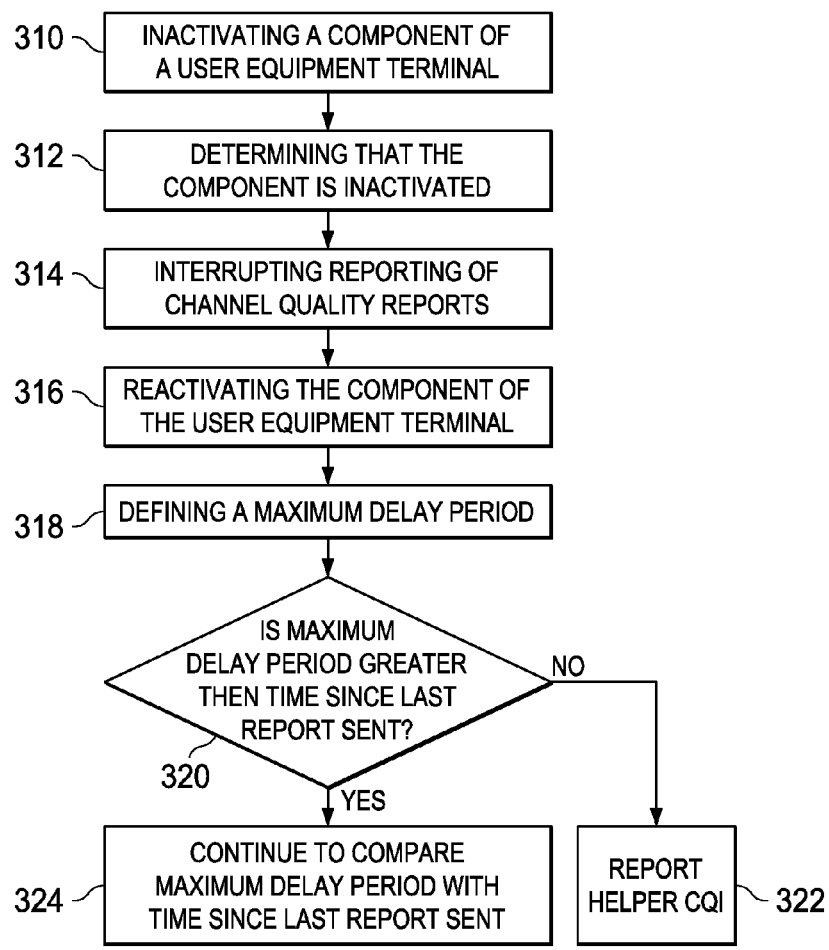
FIG. 3 illustrates a flow diagram demonstrating steps that may be performed in operation of a communication terminal constructed according to an advantageous embodiment of the invention.

Turning now to FIG. 3, illustrated is a flow diagram demonstrating steps that may be performed in operation of a communication terminal constructed according to an advantageous embodiment of the invention. The method according to the exemplary embodiment may include a step 310 of inactivating at least one component of a UE. The inactivation may be based upon inactivity of the UE in order to conserve energy in a power source, such as a battery of the UE, or the buffer status of the UE. The method may also include a step 312 of determining when the at least one component is inactivated. The method may also include a step 314 of interrupting reporting at least one channel quality indication report when at least one component of the UE is in an inactivated state. The at least one component may be inactivated based on a predefined service pattern (e.g., a predefined DRX or DTX pattern). The inactivated state of the UE may be a sleep mode of the UE or the at least one component of the UE. The step 314 of interrupting reporting may be accomplished by aligning a channel quality indication reporting pattern with a DRX or DTX pattern. The step 314 of interrupting may also be accomplished by not taking measurements used to derive CQI reports.

The method may also include a step 316 of reactivating the deactivated component of the UE, and a step 318 of defining a delay period (e.g., a maximum delay period). The method may also include a step 320 of determining whether the amount of time since the last CQI report was sent exceeds the maximum delay period. If the maximum delay period is not exceeded, then the method may include a step 324 of continuing to compare the amount since the last CQI report was sent with the maximum delay period. If the maximum delay period is exceeded, then the method may include a step 322 of transmitting a helper CQI report. In an alternative, the network or an element of the network may inform the UE when a helper CQI report should be transmitted.

Figure 4:
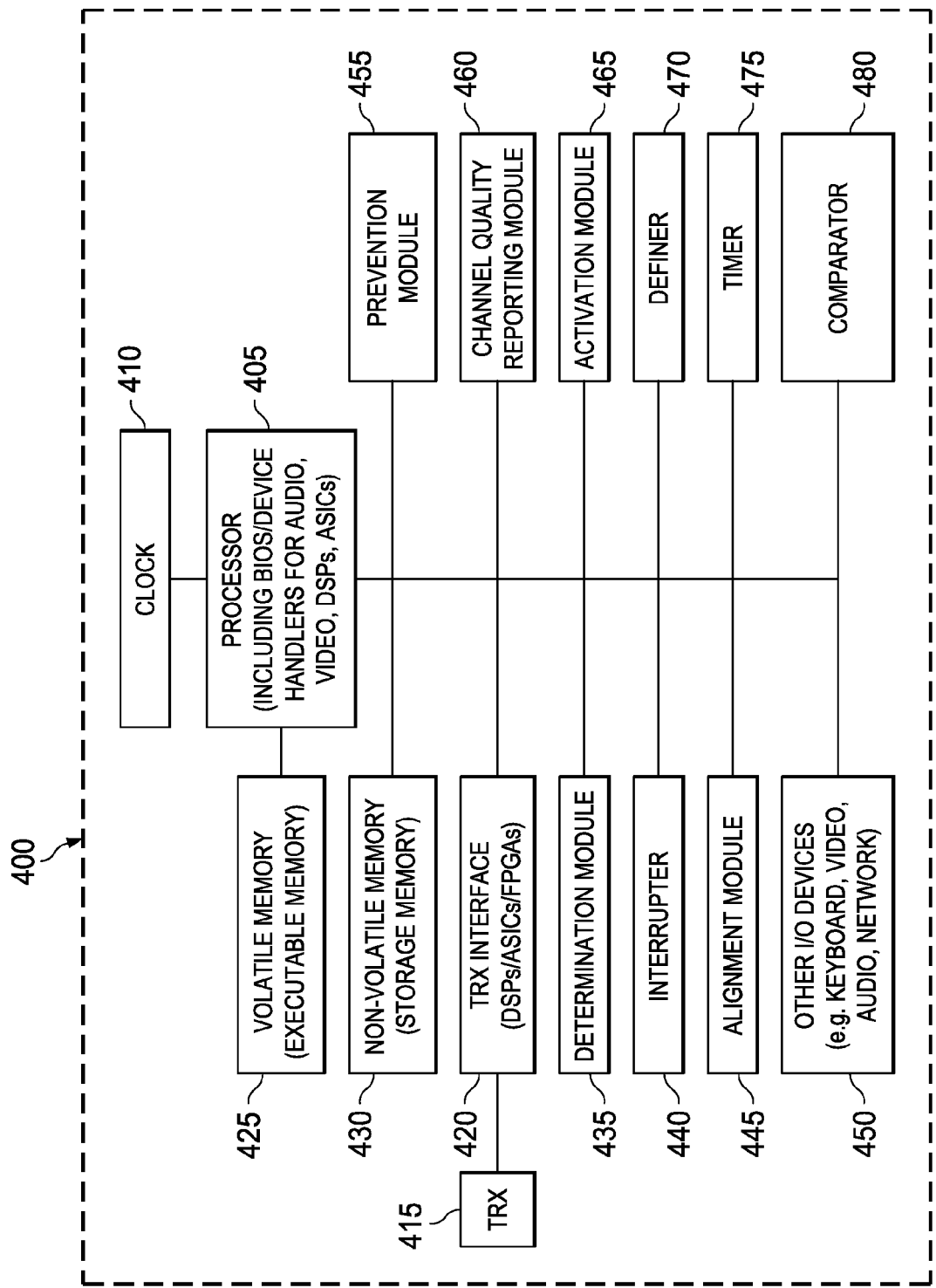
FIG. 4 illustrates a block diagram of a communication terminal constructed according to an advantageous embodiment of the invention.

Turning now to FIG. 4, illustrated is a block diagram of a communication terminal (e.g., user equipment) 400 constructed according to an advantageous embodiment of the invention. The communication terminal 400 includes a processor 405 for controlling operation of the device, including all inputs and outputs. The processor, whose speed/timing is regulated by a clock 410, may include a BIOS (basic input/output system) or may include device handlers (drivers) for controlling user audio and video input and output as well as user input from a keyboard. The BIOS/device handlers may also allow for input from and output to a network interface card. The BIOS and/or device handlers also provide for control of input and output to a transceiver (TRX) 415 via a TRX interface 420 including possibly one or more digital signal processors (DSPs), application specific integrated circuits (ASICs), and/or field programmable gate arrays (FPGAs). The TRX 415 enables communication over the air with another similarly equipped communication terminal. The communication terminal 400 may also include (depending on the application) other I/O devices 450, such as a keyboard and a mouse or other pointing device, a video display, a speaker/microphone, and also a network interface (card), allowing wireline communication with other communication terminals, and in particular, such communication over the Internet.

Still referring to FIG. 4, the communication terminal 400 includes volatile memory (e.g., executable memory 425) and also non-volatile memory (e.g., storage memory 430). The processor 405 may copy applications (e.g., a calendar application or a game) stored in the non-volatile memory 430 into the executable memory 425 for execution. The processor 405 functions according to an operating system, and to do so, the processor 405 may load at least a portion of the operating system from the storage memory 430 to the executable memory 425 in order to activate a corresponding portion of the operating system. Other parts of the operating system, and in particular often at least a portion of the basic input/output system (BIOS), may exist in the communication terminal 400 as firmware, and are then not copied into executable memory 425 in order to be executed. The booting-up instructions are a portion of the operating system.

In accordance with exemplary embodiments, communication terminal 400 may include a determination module 435 for determining when at least one component, for example, a component discussed above or any other component known to be included in communication terminal 400 such as a UE is in an inactivated state. The at least one component may be in an inactivated state periodically according to a predefined service pattern, for example, a periodic DRX. The inactivated state may correspond to a sleep mode of the communication terminal 400. The inactivated state may correspond to when the at least one component is not involved in data transfer (e.g., a non-data transfer status), or when the communication terminal 400 is not schedule for data transmission.

The communication terminal 400 may also include an interrupter 440 for interrupting reporting at least one channel quality indication (CQI) report when the at least one component is in the inactivated state. The communication terminal 400 may also include an alignment module 445 for aligning a channel quality indication reporting pattern with a discontinuous reception pattern of the communication terminal 400. In this manner, the at least one component of the communication terminal 400 is in the inactivated state during the discontinuous reception pattern, and the interrupter 440 accordingly interrupts reporting the at least one channel quality indication report. The communication terminal 400 may also include a prevention module 455 for preventing taking measurements used to derive at least one channel quality indication report. The communication terminal 400 may also include a channel quality reporting module 460 for periodically reporting at least one channel quality indication report when the at least one component is in an activated state. In this manner, the communication terminal 400 is configured to periodically report channel quality indications when at least one of its components is not inactivated. The channel quality reporting module 460 may also be configured to perform channel quality measurements and transmit the channel quality measurements, for example, in the form of a CQI report, to a network entity.

The communication terminal 400 may also include an activation module 465 for activating the at least one component to an activated state from an inactivated state. For example, the activation module 465 may be involved in "waking up" components of the communication terminal 400 after DRX periods. If the amount of time that the at least one component was in the inactivated state after being activated by the activation module 465 is greater than a delay period (e.g., a maximum delay period), the channel quality reporting module 460 may be configured to report a helper channel quality indication report to the network. This may aid the network in scheduling the communication terminal 400 in order to avoid wasting resources by having the network schedule the communication terminal 400 too conservatively. The channel quality reporting module 460 may also be configured to check a predefined channel quality indication reporting pattern (i.e., a periodic pattern used by the communication terminal 400), to determine when to report the next channel quality indication report after the at least one component has been activated to the activated state by the activation module 465.

The communication terminal 400 may also include a definer 470 for defining the maximum delay period, and a timer 475 for determining the amount of time elapsed since the last or immediately preceding channel quality indication report was reported to the network entity by the communication terminal 400. The communication terminal 400 may also include a comparator 480 for comparing the maximum delay period with the amount of time. When the amount of time is greater than the maximum delay period defined by the definer 470, the channel quality reporting module 460 may be configured to report a helper channel quality indication report. When the comparator 480 determines that the maximum delay period is greater than the amount of time, the channel quality reporting module 460 may be configured to report a channel quality indication report during the next scheduled time interval according to the periodic reporting pattern. The comparator 480 may be configured to continue to compare the maximum delay period with the greater of an amount of time elapsed since the last CQI report was transmitted and the interval of time that the at least one component was in the activated state. The channel quality reporting module 460 may be configured to report a helper CQI when the maximum delay period is exceeded by the greater of the amount of elapsed time and the interval of time since activation of the at least one component. It is also understood that the channel quality reporting module 460 may be configured to be responsive to a network entity, so that when the network entity addresses the UE in PDSCCH, the network entity may indicate to the channel quality reporting module 460 that a helper CQI report is to be transmitted. In this manner, the network entity may be involved in the decision of when a "helper CQI" may be needed.

It is understood that even though FIG. 4 shows the components of the communication terminal 400 discussed above as separate components, any of the components may be integrated together or may be provided as sub-components of other components. The functionality described above can be advantageously implemented as software modules stored in a non-volatile memory, and executed as needed by a processor, after copying all or part of the software into executable random access memory. Alternatively, the logic provided by such software can also be provided by an application specific integrated circuit. In case of a software implementation, the invention may be provided as a computer program product including a computer-readable storage structure embodying computer program code (i.e., the software therein), for execution by a computer processor.

Figure 5:
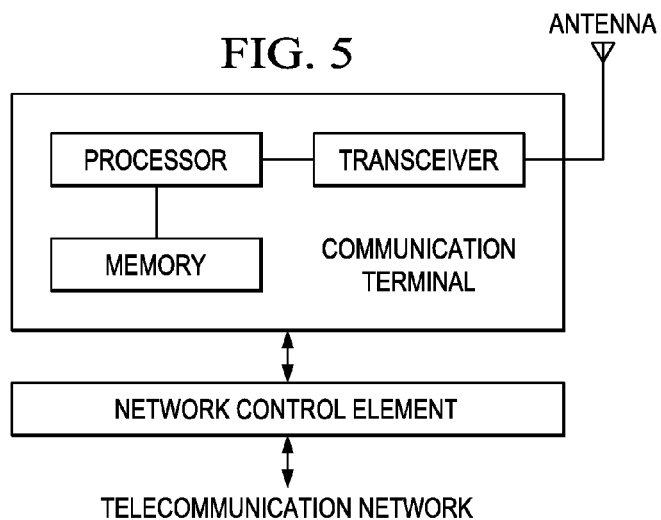
FIG. 5 illustrates a system level diagram of a communication system including a communication terminal, such as user equipment or a base station that may be used to implement an advantageous embodiment of the invention.

Turning now to FIG. 5, illustrated is a system level diagram of a communication system including a communication terminal, such as user equipment or a base station that may be used to implement an advantageous embodiment of the invention. The communication terminal may represent, without limitation, a base station, a user equipment such as a mobile station, or a network control element. The communication terminal includes a processor, memory that stores programs and data of a temporary or more permanent nature, an antenna, and a radio frequency transceiver coupled to the antenna and the processor for bidirectional wireless communications. The communication terminal may provide point-to-point and/or point-to-multipoint communication services.

The communication terminal such as a base station in a cellular network may be coupled to a communication network element such as a network control element of a public switched telecommunication network. The network control element may, in turn, be formed with a processor, memory, and other electronic elements. The network control element preferably provides access to a telecommunication network such as a public switched telecommunication network. The access may be provided by a fiber optic, coaxial, twisted pair, or microwave communication link coupled to an appropriate link-terminating element. A communication terminal formed as a mobile station is generally a self-contained device intended to be carried by an end user.

The processor in the communication terminal, which may be implemented with a plurality of processing devices, performs functions associated with its operation including, without limitation, encoding and decoding of individual bits forming a communication message, formatting of information, and overall control of the communication terminal, including processes related to management of resources. Exemplary functions related to management of resources include, without limitation, hardware installation, traffic management, performance data analysis, tracing of end users and equipment, configuration management, end user administration, management of mobile equipment, and management of tariffs, charging, and billing. The execution of all or portions of particular functions or processes related to management of resources may be performed in equipment separate from and coupled to the communication terminal, with the results of such functions or processes communicated for execution to the communication terminal. The processor of the communication terminal may be of any type suitable to the local application environment, and may include one or more of general-purpose computers, special purpose computers, microprocessors, digital signal processors ("DSPs"), and processors based on a multi-core processor architecture, as non-limiting examples.

The transceiver of the communication terminal modulates information onto a carrier waveform for transmission by the communication terminal via the antenna to another communication terminal. The transceiver demodulates information received via the antenna for further processing by other communication terminals.

The memory of the communication terminal as introduced above may be of any type suitable to the local application environment, and may be implemented using any suitable volatile or nonvolatile data storage technology such as a semiconductor-based memory device, a magnetic memory device and system, an optical memory device and system, fixed memory, and removable memory. The programs stored in the memory may include program instructions that, when executed by an associated processor, enable the communication terminal to perform tasks as described herein. Exemplary embodiments of the system, subsystems and modules as described herein may be implemented, at least in part, by computer software executable by processors of, for instance, the user equipment and the base station, or by hardware, or by combinations thereof. As will become more apparent, systems, subsystems and modules may be embodied in the communication terminal as illustrated and described above.

A communication terminal such as a UE has been described that may determine when at least one component thereof is in an inactivated state, and interrupt reporting at least one channel quality indication report when the at least one component is in the inactivated state. Energy resources may thereby be conserved.

In accordance with aspects of the present invention, a method, an apparatus, a system, and software are provided to link channel quality indication reporting with periods when communication terminals, such as user equipment, are active. Aspects of the present invention include masking a channel quality indication reporting pattern with periods when the user equipment is inactive, such as when a user equipment is involved in discontinuous reception or transmission. Aspects of the present invention may further include event-based channel quality indication reporting based on activation of previously inactive communication terminals, and the time that has passed since the last channel quality indication report was provided.

In accordance with one aspect, a method includes determining when at least one component of a communication terminal is in an inactivated state and interrupting transmitting at least one channel quality indication report when the at least one component is in the inactivated state (e.g., an inactivated state according to a predefined service pattern, a sleep mode of the at least one component, the at least one component in a non-data transfer status and a discontinuous reception period). The interrupting includes preventing taking measurements to derive the channel quality indication report. The method also includes inactivating the at least one component (e.g., to conserve energy for the communication terminal) based upon at least one of a buffer status report and inactivity of the communication terminal. The method also includes transmitting at least one the channel quality indication report when the at least one component is in an activated state in accordance with performing channel quality measurements for the at least one channel quality indication report.

The method further includes transforming the at least one component from the inactivated state to an activated state and reporting a helper channel quality indication report when an amount of time for the at least one component in the inactivated state exceeds a delay period. Alternatively, the method includes transforming the at least one component from the inactivated state to an activated state and checking a predefined channel quality reporting pattern to determine when to transmit a next channel quality indication report after the at least one component is in the activated state. Alternatively, the method includes transforming the at least one component from the inactivated state to an activated state and transmitting a helper channel quality indication report when a network entity requests the helper channel quality indication report.

The method still further includes determining an amount of time elapsed since transmitting a preceding channel quality indication report, comparing the amount of time with a delay period, and transmitting a channel quality indication report when the amount of time exceeds the delay period. The channel quality indication report may be transmitted during a next scheduled transmission time interval. The channel quality indication report may be transmitted in an acknowledgement/negative acknowledgement resource block when the amount of time exceeds the delay period. Additionally, the delay period may be defined to be greater than a hybrid automatic repeat request transmission time.

In another aspect, an apparatus (e.g., a communication terminal) includes a determination module configured to determine when at least one component of the apparatus is in an inactivated state. The apparatus also includes an interrupter configured to interrupt a transmission of at least one channel quality indication report when the at least one component is in the inactivated state (e.g., an inactivated state according to a predefined service pattern, a sleep mode of the at least one component, the at least one component is in a non-data transfer status and a discontinuous reception period). The apparatus also includes a prevention module configured to prevent taking measurements for the at least one channel quality indication report. The apparatus also includes alignment module configured to align a channel quality indication report pattern with a discontinuous reception pattern of the apparatus. The apparatus also includes a channel quality reporting module configured to transmit the at least one channel quality indication report when the at least one component is in an activated state.

In a related embodiment, the apparatus includes an activation module configured to activate the at least one component to an activated state from the inactivated state and a channel quality reporting module configured to transmit a helper channel quality indication report when an amount of time for the at least one component in the inactivated state exceeds a delay period. Alternatively, the activation module is configured to activate the at least one component to an activated state from the inactivated state and the channel quality reporting module is configured to check a predefined channel quality indication reporting pattern to determine when to report a next channel quality indication report after the at least one component is in the activated state. Alternatively, the channel quality reporting module is configured to transmit a helper channel quality indication report responsive to at least one indication from a network entity.

In a related embodiment, the apparatus includes a definer configured to define a delay period, a timer configured to determine an amount of time elapsed since transmission of an immediately preceding channel quality indication report, and a comparator configured to compare the delay period with the amount of time and report a helper channel quality indication report when the amount of time is greater than the delay period. Alternatively, the channel quality reporting module is configured to transmit the at least one channel quality indication report during a next scheduled transmission time interval according to a predefined channel quality indication reporting pattern when the comparator determines that a delay period is greater than an amount of time elapsed since transmission of an immediately preceding channel quality indication report. Alternatively, the comparator is configured to compare a delay period with a greater of an amount of time elapsed since transmission of an immediately preceding channel quality indication report and an interval of time since the at least one component was in an activated state. In accordance therewith, the channel quality reporting module is configured to transmit a helper channel quality indication report when the delay period is exceeded by the greater of the amount of time and the interval of time. Additionally, the delay period may be greater than a hybrid automatic repeat request transmission time.

In another aspect, the apparatus (e.g., the communication terminal) includes means for determining when at least one component of the apparatus is in an inactivated state and means for interrupting a transmission of at least one channel quality indication report when the at least one component is in the inactivated state. The apparatus also includes means for activating the at least one component to an activated state from the inactivated state and means for transmitting a helper channel quality indication report when an amount of time for the at least one component in the inactivated state exceeds a delay period. Alternatively, the apparatus includes means for activating the at least one component to an activated state from the inactivated state and means for checking a predefined channel quality indication reporting pattern to determine when to report a next channel quality indication report after the at least one component is in the activated state.

In a related embodiment, the apparatus includes means for defining a delay period, means for determining an amount of time elapsed since transmission of an immediately preceding channel quality indication report, and means for comparing the delay period with the amount of time and reporting a helper channel quality indication report when the amount of time is greater than the delay period. Alternatively, the apparatus includes means for transmitting the at least one channel quality indication report during a next scheduled transmission time interval according to a predefined channel quality indication reporting pattern in accordance with determining that a delay period is greater than an amount of time elapsed since transmission of an immediately preceding channel quality indication report. Alternatively, the apparatus includes means for comparing a delay period with a greater of an amount of time elapsed since transmission of an immediately preceding channel quality indication report and an interval of time since the at least one component was in an activated state and means for transmitting a helper channel quality indication report when the delay period is exceeded by the greater of the amount of time and the interval of time.

In yet another aspect, a communication system includes user equipment and a network entity. The user equipment is configured to employ discontinuous reception to provide periods of time reserved for active reception and periods of time for inactive reception to conserve energy therefor. The user equipment is configured to transmit a channel quality indication report during periods of time of active reception. The network entity is configured to communicate with the user equipment and receive the channel quality indication report therefrom. The network entity is also configured to reserve a resource to receive the channel quality indication report from the user equipment during periods of time of active reception.

In a related embodiment, the user equipment is configured to check a predefined channel quality indication reporting pattern to determine when to report a next channel quality indication report during periods of time of active reception. Alternatively, the user equipment is configured to define a delay period, determine an amount of time elapsed since transmission of an immediately preceding channel quality indication report and compare the delay period with the amount of time and report a helper channel quality indication report when the amount of time is greater than the delay period.

In a related embodiment, the user equipment is configured to transmit the channel quality indication report during a next scheduled transmission time interval according to a predefined channel quality indication reporting pattern when the user equipment determines that a delay period is greater than an amount of time elapsed since transmission of an immediately preceding channel quality indication report. Alternatively, the user equipment is configured to compare a delay period with a greater of an amount of time elapsed since transmission of an immediately preceding channel quality indication report and an interval of time since the user equipment transitioned from a period of time of inactive reception to active reception. The user equipment is configured to transmit a helper channel quality indication report when the delay period is exceeded by the greater of the amount of time and the interval of time.

In other aspects, a computer program product is provided that includes a computer readable storage structure embodying computer program code thereon for execution by a computer processor, wherein the computer program code includes instructions for performing a system and method as described above. Additionally, an application specific integrated circuit is provided that may be configured for operation according to the system and method described above.

Although the present invention and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof, to provide a reduction of energy use in a communication terminal as described herein. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method, comprising:
   determining with a processor when at least one component of a communication terminal is in an inactivated state, wherein said inactivated state is at least one of the group consisting of:
   an inactivated state according to a predefined service pattern,
   a sleep mode of said at least one component,
   said at least one component is in a non-data transfer status, and a discontinuous reception period; and
   interrupting with said processor transmitting at least one channel quality indication report when said at least one component is in said inactivated state.

2. The method as recited in claim 1 wherein said interrupting includes preventing taking measurements to derive said at least one channel quality indication report.

3. The method as recited in claim 1 further comprising transmitting said at least one channel quality indication report when said at least one component is in an activated state.

4. The method as recited in claim 1 further comprising performing channel quality measurements for said at least one channel quality indication report.

5. The method as recited in claim 1 further comprising inactivating said at least one component based upon at least one of a buffer status report and inactivity of said communication terminal.

6. The method as recited in claim 1 further comprising transforming said at least one component from said inactivated state to an activated state and reporting a helper channel quality indication report when an amount of time for said at least one component in said inactivated state exceeds a delay period.

7. The method as recited in claim 1 further comprising transforming said at least one component from said inactivated state to an activated state and checking a predefined channel quality indication reporting pattern to determine when to transmit a next channel quality indication report after said at least one component is in said activated state.

8. The method as recited in claim 1 further comprising transforming said at least one said component from said inactivated state to an activated state and transmitting a helper channel quality indication report when a network entity requests said helper channel quality indication report.

9. The method as recited in claim 1 further comprising determining an amount of time elapsed since transmitting a preceding channel quality indication report, comparing said amount of time with a delay period, and transmitting a channel quality indication report when said amount of time exceeds said delay period.

10. The method as recited in claim 9 wherein said channel quality indication report is transmitted during a next scheduled transmission time interval.

11. The method as recited in claim 9 wherein said channel quality indication report is transmitted in an acknowledgement/negative acknowledgement resource block when said amount of time exceeds said delay period.

12. An apparatus, comprising:
    a determination module configured to determine when at least one component of said apparatus is in an inactivated state, wherein said inactivated state is at least one of the group consisting of:
    an inactivated state according to a predefined service pattern,
    a sleep mode of said at least one component,
    said at least one component is in a non-data transfer status, and a discontinuous reception period; and
an interrupter configured to interrupt a transmission of at least one channel quality indication report when said at least one component is in said inactivated state.

13. The apparatus as recited in claim 11 further comprising an alignment module configured to align a channel quality indication report pattern with a discontinuous reception pattern of said apparatus.

14. The apparatus as recited in claim 11 further comprising a prevention module configured to prevent taking measurements for said at least one channel quality indication report.

15. The apparatus as recited in claim 11 further comprising a channel quality reporting module configured to transmit said at least one channel quality indication report when said at least one component is in an activated state.

16. The apparatus as recited in claim 12, further comprising:
an activation module configured to activate said at least one component to an activated state from said inactivated state; and
a channel quality reporting module configured to transmit a helper channel quality indication report when an amount of time for said at least one component in said inactivated state exceeds a delay period.

17. The apparatus as recited in claim 12, further comprising:
an activation module configured to activate said at least one component to an activated state from said inactivated state; and
a channel quality reporting module configured to check a predefined channel quality indication reporting pattern to determine when to report a next channel quality indication report after said at least one component is in said activated state.

18. The apparatus as recited in claim 12 further comprising a channel quality reporting module configured to transmit a helper channel quality indication report responsive to at least one indication from a network entity.

19. The apparatus as recited in claim 12, further comprising:
a definer configured to define a delay period;
a timer configured to determine an amount of time elapsed since transmission of a preceding channel quality indication report; and
a comparator configured to compare said delay period with said amount of time and report a helper channel quality indication report when said amount of time is greater than said delay period.

20. The apparatus as recited in claim 12 further comprising a channel quality reporting module configured to transmit said at least one channel quality indication report during a next scheduled transmission time interval according to a predefined channel quality indication reporting pattern when a comparator determines that a delay period is greater than an amount of time elapsed since transmission of a preceding channel quality indication report.

21. The apparatus as recited in claim 12, further comprising:
a comparator configured to compare a delay period with a greater of an amount of time elapsed since transmission of a preceding channel quality indication report and an interval of time since said at least one component was in an activated state; and
a channel quality reporting module configured to transmit a helper channel quality indication report when said delay period is exceeded by said greater of said amount of time and said interval of time.

22. The apparatus as recited in claim 12 further comprising a definer configured to define a delay period that is greater than a hybrid automatic repeat request transmission time.

23. An apparatus, comprising:
means for determining when at least one component of said apparatus is in an inactivated state, wherein said inactivated state is at least one of the group consisting of:
an inactivated state according to a predefined service pattern,
a sleep mode of said at least one component,
said at least one component is in a non-data transfer status, and
a discontinuous reception period; and
means for interrupting a transmission of at least one channel quality indication report when said at least one component is in said inactivated state.

24. The apparatus as recited in claim 23, further comprising:
means for activating said at least one component to an activated state from said inactivated state; and
means for transmitting a helper channel quality indication report when an amount of time for said at least one component in said inactivated state exceeds a delay period.

25. The apparatus as recited in claim 23, further comprising:
means for activating said at least one component to an activated state from said inactivated state; and
means for checking a predefined channel quality indication reporting pattern to determine when to report a next channel quality indication report after said at least one component is in said activated state.

26. The apparatus as recited in claim 23, further comprising:
means for defining a delay period;
means for determining an amount of time elapsed since transmission of a preceding channel quality indication report; and
means for comparing said delay period with said amount of time and reporting a helper channel quality indication report when said amount of time is greater than said delay period.

27. The apparatus as recited in claim 23 further comprising means for transmitting said at least one channel quality indication report during a next scheduled transmission time interval according to a predefined channel quality indication reporting pattern in accordance with determining that a delay period is greater than an amount of time elapsed since transmission of a preceding channel quality indication report.

28. The apparatus as recited in claim 23, further comprising:
means for comparing a delay period with a greater of an amount of time elapsed since transmission of a preceding channel quality indication report and an interval of time since said at least one component was in an activated state; and
means for transmitting a helper channel quality indication report when said delay period is exceeded by said greater of said amount of time and said interval of time.

* * * * *

UNITED STATES PATENT AND TRADEMARK OFFICE
CERTIFICATE OF CORRECTION

| | | |
|---|---|---|
| PATENT NO. | : 7,724,697 B2 | Page 1 of 1 |
| APPLICATION NO. | : 11/970390 | |
| DATED | : May 25, 2010 | |
| INVENTOR(S) | : Dalsgaard et al. | |

It is certified that error appears in the above-identified patent and that said Letters Patent is hereby corrected as shown below:

On the Title Page illustration, inside the diamond figure, delete "THEN" and insert --THAN--.
In the drawings, Sheet 3, Fig. 3, inside the diamond figure, delete "THEN" and insert --THAN--.
In Col. 7, lines 13-14, delete "pattern in which an extra channel quality indication report may be provided if a delay is exceed" and insert --pattern, in which an extra channel quality indication report may be provided if a delay is exceeded,--.
In Col. 8, line 44, delete "more course" and insert --coarser--.
In Col. 9, line 67, delete "schedule" and insert --scheduled--.
In Col. 12, line 66, delete "at least one the" and insert --the at least one--.
In Col. 17, line 5, claim 13, delete "11" and insert --12--.
In Col. 17, line 9, claim 14, delete "11" and insert --12--.
In Col. 17, line 12, claim 15, delete "11" and insert --12--.

Signed and Sealed this
Ninth Day of August, 2011

David J. Kappos
*Director of the United States Patent and Trademark Office*